United States Patent
Welle (10) Patent No.: US 12,526,934 B2
(45) Date of Patent: Jan. 13, 2026

(54) RETROFITTING MODULE FOR A FIELD DEVICE AND FIELD DEVICE WITH A MODULAR DESIGN

(71) Applicant: VEGA GRIESHABER KG, Wolfach (DE)

(72) Inventor: Roland Welle, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 399 days.

(21) Appl. No.: 17/919,685

(22) PCT Filed: May 5, 2020

(86) PCT No.: PCT/EP2020/062429
§ 371 (c)(1),
(2) Date: Oct. 18, 2022

(87) PCT Pub. No.: WO2021/223854
PCT Pub. Date: Nov. 11, 2021

(65) Prior Publication Data
US 2023/0189459 A1    Jun. 15, 2023

(51) Int. Cl.
*H05K 5/02*    (2006.01)

(52) U.S. Cl.
CPC ......... *H05K 5/0217* (2013.01); *H05K 5/0208* (2013.01)

(58) Field of Classification Search
CPC .... H05K 5/0217; H05K 5/0208; G06F 21/31; G06F 21/70; G05B 19/0428
See application file for complete search history.

(56) References Cited

U.S. PATENT DOCUMENTS

| | | | | |
|---|---|---|---|---|
| 7,877,563 | B2 * | 1/2011 | Breslau | G06F 21/85 711/115 |
| 8,165,141 | B2 * | 4/2012 | Balgard | H04L 41/0809 455/410 |
| 10,546,135 | B1 * | 1/2020 | Kassoumeh | G06F 21/577 |
| 10,692,403 | B2 * | 6/2020 | Aschauer | G06F 21/85 |
| 2006/0142873 | A1 * | 6/2006 | Opem | G05B 9/02 700/1 |
| 2007/0020976 | A1 * | 1/2007 | Tirtosupono | H01R 13/64 439/133 |

(Continued)

FOREIGN PATENT DOCUMENTS

| | | |
|---|---|---|
| CN | 110971587 A | 4/2020 |
| DE | 102019126452 | 4/2020 |

(Continued)

OTHER PUBLICATIONS

International search report for action for related International application PCT/EP20/062430, issued on Mar. 23, 2021, with accompanying written opinion.

(Continued)

*Primary Examiner* — Nay Tun
(74) *Attorney, Agent, or Firm* — William Gray Mitchell (57) ABSTRACT

A retrofitting module for a process automation field device comprising field device electronics with at least one communication interface, characterized in that the retrofitting module has a security module, wherein the security module cooperates with the field device electronics such that a predetermined IT security level is achieved.

14 Claims, 2 Drawing Sheets

(56) References Cited

U.S. PATENT DOCUMENTS

| | | | | |
|---|---|---|---|---|
| 2009/0178019 | A1* | 7/2009 | Bahrs | G06F 21/62 |
| | | | | 717/104 |
| 2011/0257766 | A1* | 10/2011 | Sundaram | G05B 19/4185 |
| | | | | 700/7 |
| 2013/0151849 | A1* | 6/2013 | Graham | G06F 21/85 |
| | | | | 713/164 |
| 2018/0035297 | A1* | 2/2018 | Cronin | H04L 63/105 |
| 2019/0028466 | A1* | 1/2019 | Falk | H04L 9/3268 |
| 2019/0103914 | A1* | 4/2019 | Junk | H04W 4/80 |
| 2019/0289020 | A1* | 9/2019 | Heintel | H04L 63/1408 |
| 2019/0370505 | A1* | 12/2019 | Venema | G05B 19/0423 |
| 2020/0106864 | A1* | 4/2020 | Denison | H04W 88/10 |
| 2021/0194851 | A1* | 6/2021 | Barton | H04L 41/0894 |
| 2022/0319686 | A1* | 10/2022 | Blancke | A61M 5/31568 |

FOREIGN PATENT DOCUMENTS

| | | | |
|---|---|---|---|
| EP | 1966565 | A1 | 10/2008 |
| EP | 3451215 | A1 | 3/2019 |

OTHER PUBLICATIONS

International search report for action for related International application PCT/EP20/062429, issued on Feb. 8, 2021.
EPO Search Report for sibling application 20724081.3, dated Apr. 19, 2024.
Office Action for related Chinese application 202080100375.9, issued on Jan. 19, 2025.

\* cited by examiner

RETROFITTING MODULE FOR A FIELD DEVICE AND FIELD DEVICE WITH A MODULAR DESIGN

CROSS REFERENCE TO RELATED APPLICATIONS

This patent application claims priority International Patent Application PCT/EP2020/062429, filed on May 5, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a retrofitting module for a process automation field device and a field device with a modular design.

Background of the Invention

The term field device in this case subsumes various technical systems which are directly related to a production process. Field devices may therefore be actuators, sensors and measuring transmitters and/or evaluation instruments in particular.

Superordinate units, which are to be assigned to the field of control rooms, should be clearly differentiated from field devices in the terminology, as they are used in the present application.

Known field devices for process automation have hitherto had only producer-specifically defined devices and methods for implementing aspects of IT security. Recent legal requirements in various countries require the implementation of predetermined security levels (SL) for critical infrastructure systems (KRITIS).

For many years, field devices have, as process measuring devices, reliably measured process-relevant measured values of media in a very wide range of applications. In the initial years of process control engineering, the measured values determined were for the most part transmitted in an analogue manner with the aid of analogue interfaces, for example a 4-20 mA interface, from a process measuring device to a superordinate unit, for example an evaluation device or a process control centre. In the course of digitization, this standard was extended by the additional imposition of digital signals, for example in accordance with the HART standard, as a result of which bidirectional communication between process measuring device and process control centre also became possible. However, it was characteristic of such process control systems that the installations were substantially operated using isolated operation. A connection between different process control systems of different sites or different companies or a connection of the systems to the World Wide Web was not provided.

In recent years, with the approaches of the fourth industrial revolution (Industry 4.0) in particular, the necessity has been established for linking entire process control systems or else also entire production sites to one another by a higher degree of networking, for example via the World Wide Web. The associated networking of industrial IT systems and office IT systems leads however to a series of new challenges, particularly in the field of IT security, which makes continued development of existing devices and components urgently necessary.

A further field of application results due to self-supporting field devices, particularly self-supporting sensors, which have become available recently. Sensors, that is to say field devices of this product family are characterized by particularly simple assembly without attaching a communication or supply line. The measured values determined by these field devices are typically transmitted to a cloud, that is to say to a server in the World Wide Web, using a narrowband radio technology (LoRa, Sigfox, NB-IoT). Typical use scenarios for such field devices include fields such as flood forecasting, inventory management or even other decentralized distributed measurement tasks. Due to the direct connection to the World Wide Web, such field devices are inherently exposed to a permanent threat due to hacker attacks from the web.

In order to ensure the availability of productive systems even in the future, standards are currently defined by various industries, which aim to harden the components of process management systems with respect to their resilience with respect to negligently or maliciously initiated external attacks and therefore to increase the availability of the field device and therefore to ensure the productivity of the installation operators.

Furthermore, new requirements for the operators and producers of devices are formulated on the part of legislators, which pursue the aim of making critical infrastructure systems (KRITIS), such as for example energy (power, gas, oil), transport (air, rail, water, road), drinking water supply or else digital infrastructure resistant with respect to negligent or malicious hacker attacks. An example of this is the directive agreed 2016/1148 (NIS directive) by the European Parliament, which has since been implemented in national law by the member states of the European Union.

Depending on the vulnerability at the respective usage site, it has been required in hitherto existing cybersecurity standards (e.g. IEC 62443, ISO 27001), that the devices used there meet a standardized IT security level (SL).

IEC 62443 (status as of August 2013) for example, has defined the following security levels for this, which are classified according to the means available to the attacker, material and financial resources available to the attacker, technical capabilities and the underlying motivation of the attacker.

| | Capabilities of the attacker | | | |
|---|---|---|---|---|
| | Means | Resources | Capabilities | Motivation |
| SL0 | no risk of impairment/manipulation | | | |
| SL1 | inadvertent/incidental impairment/manipulation | | | |
| SL2 | simple | limited | generic | low |
| SL3 | sophisticated | medium | domain-specific | medium |
| SL4 | sophisticated | comprehensive | domain-specific | high |

The security level SL0 is a purely theoretical construct here, in which there is no impairment or manipulation risk whatsoever and therefore no measures are necessary.

The security level SL1 describes the capability of a system to avoid inadvertent and unintentional impairments or manipulations.

The security level SL2 describes the capability of a system to repel intentional manipulations by interested individuals and companies with generic security knowledge.

The security level SL3 describes the capability of a system to repel intentional manipulations by experts and companies which, with clear aims, develop and deploy effective, yet cost-orientated attack scenarios.

The security level SL4 describes the capability of a system to repel intentional manipulations of organizations with experts, for whom reaching the specifically selected attack target at virtually any price is paramount.

For producers of field devices, particularly also for the producers of fill-level and pressure sensors, there is a growing need from these boundary conditions to implement the IT security requirements which are anchored in different (industry specific) standards and laws.

This implementation of extended measures regularly makes it necessary to integrate additional hardware components and/or additional software components into the field devices. If the meeting of a security level (SL) is required for existing devices or the requirements for attaining a certification for a defined security level (SL) change, then this regularly leads to having to revise the mechanical and electrical design of such devices. The customer must then replace devices that have already been delivered with the correspondingly certified successor devices, which leads to corresponding costs and maintenance outlay.

In addition, there is the problem that industry specific standards with the IT security levels SL respectively defined therein must be taken into account from a technical point of view. That aside, the different regulations from the part of the legislator are also to be taken into account.

Furthermore, on the part of the producers, there is the problem that devices have to be developed, manufactured and distributed for different security standards and different security levels (SL), if appropriate also corresponding to the different standards in various countries.

An obvious solution consists in providing devices for the different industries in a targeted fashion, which take account of the respectively required industry specific IT security levels SL from a technical point of view. However, in order to be prepared for all possible use cases within a refinery for example, different devices must also be provided in principle for each IT security level required by the customer. It is obvious that this approach massively increases the variety of device variants and therefore makes the development and production of corresponding field devices uneconomical. If by contrast, in principle only one single industry specific device is provided, which implements the highest security level, this would lead to high hardware costs and high energy consumption connected with reduced ergonomics during operation of the devices.

Furthermore, there is the problem that a specific implementation is only possible for new devices, but existing devices must no longer be operated under correspondingly increased IT security requirements.

It is the object of the present invention to create a possibility for how new devices can be flexibly adapted to different IT security requirements and also existing devices can be operated further under increased IT security requirements.

This object is achieved by a retrofitting module with the features described herein.

BRIEF SUMMARY OF THE INVENTION

In a preferred embodiment, a retrofitting module (201, 301, 401) for a process automation field device (101, 105, 108, 402) comprising field device electronics (112, 405) with at least one communication interface, characterized in that the retrofitting module (201, 301, 401) has a security module, wherein the security module (401, 409) cooperates with the field device electronics (112, 405) such that a predetermined IT security level (SL) is achieved.

In another preferred embodiment, the retrofitting module (201, 301, 401) as described herein, characterized in that the retrofitting module (201, 301, 401) has a first electrical interface (102) for connecting the field device electronics (112, 405) of the fill level measuring device and a communication module for connecting to a superordinate unit.

In another preferred embodiment, the retrofitting module (201, 301, 401) as described herein, characterized in that the first interface (102) is designed for connecting to the communication interface of the field device (101, 105, 108, 402).

In another preferred embodiment, the retrofitting module (201, 301, 401) as described herein, characterized in that the one connection of the first interface (102) to the communication interface is designed to be mechanically irreversible.

In another preferred embodiment, the retrofitting module (201, 301, 401) as described herein, characterized in that a connection of the first interface (102) to the communication interface irreversibly interrupts a connection of the field device electronics (112, 405) to the superordinate unit.

In another preferred embodiment, the retrofitting module (201, 301, 401) as described herein, characterized in that the retrofitting module (201, 301, 401) has a mechanical interface (102) for irreversible connection to the field device (101, 105, 108, 402).

In another preferred embodiment, the retrofitting module (201, 301, 401) as described herein, characterized in that the retrofitting module (201, 301, 401) comprises an irreversible latching connection and/or an irreversible screwed connection and/or an irreversible adhesively bonded connection and/or an irreversible barrier.

In another preferred embodiment, the retrofitting module (201, 301, 401) as described herein, characterized in that the retrofitting module (201, 301, 401) has a cryptomodule for signing and/or encrypting data.

In another preferred embodiment, the retrofitting module (201, 301, 401) as described herein, characterized in that the retrofitting module (201, 301, 401) has an authentication module.

In another preferred embodiment, the retrofitting module (201, 301, 401) as described herein, characterized in that the retrofitting module (201, 301, 401) has an authentication interface for an external, second authentication module.

In another preferred embodiment, the retrofitting module (201, 301, 401) as described herein, characterized in that the retrofitting module (201, 301, 401) has a firewall, particularly a packet filter.

In another preferred embodiment, the retrofitting module (201, 301, 401) as described herein, characterized in that the retrofitting module (201, 301, 401) is designed as a display and/or control module (103, 109).

In another preferred embodiment, the retrofitting module (201, 301, 401) as described herein, characterized in that the security module has a plurality of functional units for implementing a plurality of predetermined IT security levels (SL) of different severity, wherein the security module has a selection element for selecting an IT security level (SL), wherein on the basis of the selection, the functional units necessary for implementing the selected IT security level (SL) are activated and/or the functional units not required are deactivated.

In another preferred embodiment, the retrofitting module (201, 301, 401) as described herein, characterized in that the security module is designed such that a one-time selection of the IT security level (SL) is possible.

In another preferred embodiment, the retrofitting module (201, 301, 401) as described herein, characterized in that the security module is designed such that a selection of the IT security level (SL) is possible during commissioning of the retrofitting module (201, 301, 401).

In another preferred embodiment, a modularly constructed process automation field device comprising field device electronics (112, 405) with at least one communication interface, characterized in that the field device (101, 105, 108, 402) has a retrofitting module (201, 301, 401) as described herein, which is connected to the communication interface of the field device electronics (112).

DETAILED DESCRIPTION OF THE INVENTION

A retrofitting module according to the invention for a process automation field device, wherein the field device has field device electronics with at least one communication interface, is characterized in that the retrofitting module has a security module, wherein the security module cooperates with the field device electronics such that a predetermined IT security level is achieved.

Both new devices and existing devices can be equipped with such a retrofitting module. Both new devices and existing device can thus, depending on the requirement, be provided with an adapted IT security module which implements a desired IT security level.

As a result, it is possible, by means of a plurality of different retrofitting modules, to equip or to provide both new devices and existing devices with different IT security levels, without it having been necessary to keep a completely new device, which implements the respective IT security level, in reserve in each case. For producers, it therefore becomes easier to offer adapted field devices, wherein a basic device remains identical however and the same is only supplemented by the corresponding retrofitting module. For users or operators of existing devices, the possibility is created in this manner to adapt their existing devices to changed IT security levels, without having to replace the respective existing devices. The existing devices are retrofitted by a retrofitting module, which implements the desired IT security level and thus toughened up for operation under raised IT security requirements.

The basic idea of the present invention is to provide a retrofitting module and thus to configure new devices or existing devices such that the same are made capable of realizing predetermined IT security levels.

A corresponding retrofitting module may be used particularly well in the case of modular field devices.

Modularly constructed field devices are put together from a modular field device concept. In a modular field device concept, it is possible to select from a plurality of combinable sensors, housings, electronic units and control and/or display units and for a corresponding field device to be built. Such a modular field device concept is offered for example by the company Vega Grieshaber KG. In general, a sensor; a corresponding electronic module, which provides measured value processing and an interface for a control and, if appropriate, a field bus that is used; and various display and/or control units can be combined. The sensors, electronic modules and displays and/or control units can be adapted both to one another and to various available housings.

The retrofitting module can have a plurality of functional units for implementing the predetermined IT security level. In this manner, a plurality of different retrofitting modules with different functional units can be provided, which implement different IT security levels in cooperation with a field device.

Alternatively, a retrofitting module can be configured such that it can implement a plurality of different IT security levels in cooperation with a field device. In this context, this means that at least two different IT security levels can be implemented by means of at least two functional units. Depending on the given requirements, individual functional units which are not required or not permitted for implementing a certain IT security level can then be deactivated, or required or mandatory functional units for implementing a certain IT security level can then be activated, so that a plurality of different IT security levels can be implemented using a retrofitting module.

In the present application, functional units is understood to mean function blocks implemented in hardware or software, which are decisive for compliance with the predetermined IT security levels. In particular, the IT security levels of different severity generally differ in terms of one functional unit, i.e. at least one functional unit is activated or deactivated to implement the one IT security level, which is correspondingly not activated or deactivated to implement a different IT security level.

The IT security levels on which this application is based may relate to various aspects of IT security and be implemented by means of various measures, which are combined in the present application in the functional units.

Aspects of IT security, as can be implemented in the representational IT security levels of the application, are inter alia various levels of identification and authentication of users, devices and software, usage control, securing the communication of the field device with regards to authentication and integrity, and also for example required reaction times.

The retrofitting module can to this end have a first electrical interface for connecting the field device electronics of the fill level measuring device and a communication module for connecting to a superordinate unit. By means of the first electrical interface, the retrofitting module can be connected to the field device electronics, preferably a communication interface, further preferably a wired communication interface of the field device electronics. The retrofitting module can establish external communication using the communication module. External in this sense means to a unit outside of the field device, particularly a superordinate unit, a control unit or other field devices.

In this context, aside from evaluation devices and computers, for example in a control room, superordinate units may also be servers in a LAN (local area network) or WAN (wide area network) environment. Even devices in virtual private networks (VPNs) are covered by this.

The first interface of the retrofitting module is preferably designed for connecting to the communication interface of the field device. A simple connection of the retrofitting module to the field device electronics is enabled in this manner. If appropriate, available plug contacts or connecting terminals can be used to this end and thus a direct connection of the retrofitting module to the field device electronics can be realized.

If the communication interface of the field device is a wired interface and is connected to the retrofitting module in this manner, then by means of a suitable configuration of the connection it is furthermore possible that other, possibly unsecured external communication connections can be established by the communication interface. In the simplest case, a slot of the communication interface is occupied by the retrofitting module connected thereto and thus there is no further connection option.

In order to achieve greatest possible manipulation security, a connection of the first interface to the communication interface can be designed to be mechanically irreversible. This means that the connection can no longer be detached once it has been produced. For example, the connection cannot be detached without destroying the connection or there at least being a detectable violation of the security level.

This may be achieved for example, in that a connection of the first interface to the communication interface irreversibly interrupts a connection of the field device electronics to the superordinate unit. If the connection to the retrofitting module is detached again, then a direct connection of the field device electronics to the superordinate unit is also interrupted, which can be detected by the same for example.

One possibility for such an irreversible interruption can for example be achieved by means of insulation-displacement contacts, which interrupt a cable connection from the field device electronics to the superordinate unit and at the same time produce the connection to the retrofitting module. If this connection is detached again, then the connection from the field device electronics to the superordinate unit is also interrupted. As this connection cannot readily be reproduced without a short interruption, a manipulation attempt is detected and it is possible to react accordingly.

Additionally or alternatively, the retrofitting module may have a mechanical interface for irreversible connection to the fill level measuring device. Such a mechanically irreversible connection ensures that the connection between the fill level measuring device and the retrofitting module can no longer be detached and thus the retrofitting module can also no longer be removed.

The mechanically irreversible connection between the retrofitting module and the field device can irreversibly anchor the retrofitting module for example in a housing chamber, in which it is arranged. This means that the retrofitting module, if it had been installed properly, can no longer be removed.

Both the proper installation and a possibly impermissible removal can be monitored by means of corresponding contact switches. Such a tamper contact would then notify the superordinate unit if the retrofitting module was unlawfully removed or manipulated. The unlawful interference is thus detected and countermeasures can be taken.

The mechanically irreversible connection can for example be designed as an irreversible latching connection and/or an irreversible screwed connection and/or an irreversible adhesively bonded connection and/or comprise an irreversible barrier.

An irreversible barrier may e.g. be a housing lid, which irreversibly closes a housing chamber, in which the retrofitting module is arranged. To this end, an original housing lid can be exchanged and replaced with a self-securing lid. A self-securing lid can for example have latching hooks or the like, which prevent opening of the lid after an initial complete closure. Additionally or alternatively, the self-securing lid can have an adhesive bond, which fixes the lid in a screwed position.

In one embodiment, the retrofitting module has a cryptomodule for signing and/or encrypting data. By means of a signature, a receiver can ensure that data originate from a certain originator, here the retrofitting module and indirectly therefore from the field device equipped therewith. Furthermore, the data integrity can be ensured, i.e. a receiver of the data can verify that the data have not been changed since the signing by the sender, that is to say the retrofitting module. Overall, due to such a cryptomodule, the data transmission from the field device, which is equipped with the retrofitting module, to superordinate units can therefore be configured more securely.

It is emphasized at this point that the cryptomodule that we previously described does not necessarily effect an encryption, but rather even just the provision of the sent data with a signature may be an object of a cryptomodule according to the present invention.

The cryptomodule can be designed both as hardware and as a software module, i.e. it may be formed both by hardware components, particularly a dedicated cryptochip, and by software components, i.e. as corresponding computer program code, which when it is executed by a processor accomplishes the signing and/or encryption of the data.

In the present application, software components are understood to mean parts or modules of software, i.e. computer program code, which, when it is executed by a processor, causes the same to execute commands for realizing the desired functionality of the software component.

The retrofitting module can additionally or alternatively have an authentication module. An authentication module may comprise different components depending on the desired IT security level. Thus, it may for example have a user and password management system, authorization management system, a module for multifactor authentication and if appropriate necessary hardware interfaces therefor. Corresponding hardware interfaces can for example be sensors for presence detection, input fields for a PIN, sensors for biometric data, for example fingerprint sensors or retina scanners, and/or interfaces for reading mechanical keys and/or electrically readable tokens, particularly NFC interfaces for reading NFC tokens or the like.

The user authentication may in this case not only comprise authentication of operating personnel, but rather also implement authentication of permitted control devices and/or communication partners.

The retrofitting module may further have an authentication interface for an external, second authentication module. Such an external, second authentication module may for example be an authentication module of a control device, so that the user authentication at the control device is also taken on for the field device as long as the control device has been sufficiently authenticated with respect to the retrofitting module.

Authentication can therefore take place not only for operating personnel, but also for devices which communicate with the field device.

The authentication module can likewise be designed as a hardware component and, as long as no hardware is necessary, also as a software component.

Additionally or alternatively, the retrofitting module may have a firewall, particularly a packet filter. By means of a firewall functionality, it is possible to ensure that only authorized users can establish a connection to the retrofitting module and therefore the field device (connection filter) or that only harmless packets pass the retrofitting module and thus penetrate to the field device for further processing.

The retrofitting module can in one embodiment be designed as a display and/or control module or alternatively have one such. Particularly in the case of modularly constructed field devices, for example a display and/or control module which is regularly available can thus be replaced by the retrofitting module, which is designed as a display and/or control module, or by a display and/or control module, which has the retrofitting module.

Particularly in the case of the modular field device system of the applicant, it is appropriate to integrate the retrofitting module into the existing modular system.

The security module can have a plurality of functional units for implementing a plurality of predetermined IT security levels of different severity, wherein the security module has a selection element for selecting an IT security level, wherein on the basis of the selection, the functional units necessary for implementing the selected IT security level are activated and/or the functional units not required are deactivated.

It is mentioned at this point that activation and deactivation relates to operation, i.e. switched-on state of the retrofitting module or field device and in this context means persistent commissioning or decommissioning of the respective functional units. Deactivation or in other words switching off of the entire field device does not have any influence on the status of the functional units after a renewed switching on of the field device.

In one embodiment of the retrofitting module, the security module is designed such that a one-time selection of the IT security level is possible. This means in this context that the IT security level can be selected once and is subsequently fixed, that is to say unchangeable. In particular, the IT security level can be selected once by the user. This means that the retrofitting module in the delivery state can have no or any desired IT security level which can be predetermined by the producer, and which can then be changed once by the user.

A one-time user-side selection may in this case in particular mean that a subsequent user-side change of the IT security level is not possible. In certain embodiments, it is possible to differentiate between a user-side change of the IT security level and an administrator-side change of the IT security level. This means that it can be provided in an embodiment that an administrator can also still subsequently change the IT security level even after an initial setting during commissioning. To this end, it may however be provided for example, that this can take place in addition to an authentication as administrator only using a device-specific unlock code and/or using an additional producer-side approval.

To ensure that the field device provided with the retrofitting module can only be operated with the desired security level, the security module can be configured such that a selection of the IT security level during commissioning of the field device provided with the retrofitting module is possible and in particular required.

In this manner, the operator of an installation can be urged to select the appropriate security level during the commissioning of a new or retrofitted field device. This is then set and fixed with the commissioning. Additionally or alternatively to the above-described procedure, subsequent changing of the IT security level may be connected with resetting of the field device to factory settings, i.e. to the delivery state and thus with renewed commissioning.

A one-time selection option can for example be realized in that the selection element is designed in a mechanically irreversible manner. A mechanically irreversible design of the selection element can for example take place by means of a suitable latching of a one-time activated setting. Such a latching can e.g. be configured such that a change of the selection element is only possible towards a higher IT security level. Alternatively, the selection element can also be fixed mechanically, for example adhesively bonded or fixed in another manner. Additionally or alternatively, a mechanical selection element can also have a predetermined breaking point, i.e. the selection element breaks off at this predetermined breaking point during initial user-side setting of the IT security level upon successful setting and thus makes subsequent changing of the IT security level impossible.

Additionally or alternatively, the security module can be configured such that a selection of the IT security level is electronically irreversible. This may be achieved for example in that after first reading of the selection element, the electrical connections required therefor are interrupted. This may take place for example by means of the targeted interruption of fuses installed there or the destruction of the electrical readability of the selection element in another way. Additionally or alternatively, functional elements, which are deactivated for implementing the selected IT security level, can also be hindered during the setting of the IT security level from reactivating by means of permanent interruption of the electrical connection to these functional elements.

For example, it may be specified that a radio interface be decommissioned for implementing a certain IT security level. In the previously described embodiment, a reactivation of the radio interface can be prevented in that for example an electrical connection to the radio interface is permanently interrupted or for example a transmission element is made dysfunctional in a targeted fashion.

Additionally or alternatively, the security module can be configured such that a selection of the IT security level is irreversible in terms of software technology. For example, a part of program code, which realizes reading of the selection element and setting of the IT security level, can after successful setting of the IT security level be deleted or otherwise changed such that a renewed reading of the selection element is not possible. In this embodiment, the selection element could then—if a change is not also suppressed at this point—be adjusted to the selection of a different one compared to the set IT security level, but this changed selection is no longer read and the IT security level is therefore not adjusted.

In order to ensure that a once selected IT security level is at least not lowered, i.e. an IT security level with a lower IT security level is subsequently selected, it may be provided that the retrofitting module has the lowest IT security level upon delivery and the security module is designed such that an increase of the IT security level is possible exclusively. This functionality can be achieved both by a suitable configuration of the hardware, for example the selection element, and a suitable software implementation.

Alternatively, it is also possible that the retrofitting module is delivered in the highest IT security level and only a lowering of the IT security level is possible.

In one embodiment, the selection element can be designed as a hardware switch, preferably as a slide switch or rotary switch. By means of such a hardware switch, a selection of the IT security level can take place intuitively and in a user-friendly manner. A design of the selection element implemented in hardware may form an effective protection against network-based attacks and thus contribute to securing the field device.

In a further embodiment, the selection element can be configured as a selection menu in a user interface. Typically, the process of commissioning the retrofitting module or the field device provided with the retrofitting module comprises various parameterization steps, into which a selection of the IT security level can seamlessly be introduced in this manner.

In an embodiment of the retrofitting module, the selection element may activate a multiplexer, which is connected to the functional units for implementing the IT security level at least in the delivery state. In this manner, the various functional units for implementing the IT security level can be activated or deactivated via a suitable activation of the multiplexer.

Furthermore, the retrofitting module may also comprise a firmware update for the field device present. By means of such a firmware update for the field device, it can for example be ensured that for example the field device electronics-depending on the selected security level-only still accept certain communication paths, remote terminals or add-on modules and/or a deinstallation of the retrofitting module is denied.

According to the invention, a modular process automation field device comprising field device electronics with at least one communication interface, wherein the field device has a retrofitting module according to the invention according to one of the preceding claims, which is connected to the communication interface of the field device electronics.

DETAILED DESCRIPTION OF THE FIGURES

The exemplary embodiments of field devices presented in the following show exemplary implementations for the implementation of IT security levels SL on the basis of the definitions of the standard IEC 62443. The examples should have a purely exemplary character for clarifying the fundamental structures and processes and in principle include the transfer to other existing or future arising standards with comparable concepts for the standardized definition of security levels according to the understanding of the present invention. It may in particular be provided to combine existing IT security levels SL in future standards, in order for example to create a new definition of IT security levels SL according to the schema BASIC (corresponding to SL0+ SL1), SUBSTANTIAL (corresponding to SL2+SL3) and HIGH (corresponding to SL4). The application of the present invention in the context of newly defined security levels can be realized by a person skilled in the art in an obvious manner, which is why even future new definitions of security levels should also be covered in the context of the present invention.

Figures 1, 1A, 1B:
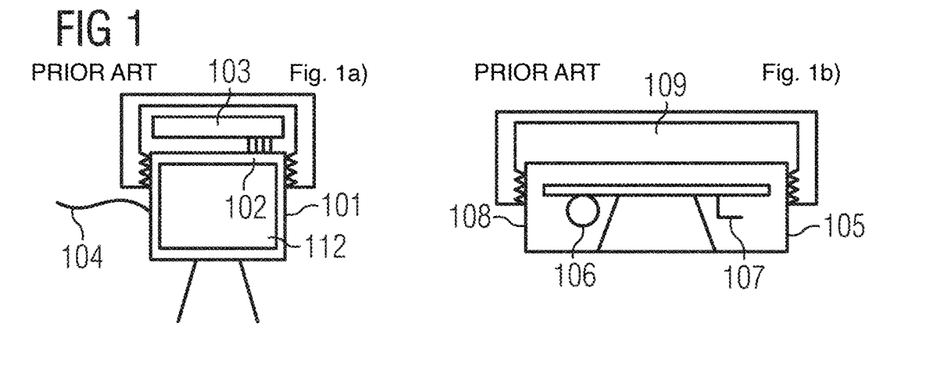
FIG. 1 is a line drawing evidencing two field devices according to the prior art.

FIG. 1 shows two field devices 101, 102 according to the prior art in the part FIGS. 1a) and 1b).

FIG. 1a) shows a field device 101, which is operated in a wired manner and is designed as a radar fill level measuring device. The field device 101 obtains its energy required for operation via a cable connection 104, usually an analogue or digital connection 104. In the present case, the field device 101 is designed as a two-wire field device.

A two-wire field device according to the present invention is understood to mean a field device which is connected to a superordinate unit via two wires, wherein both energy supply and also measured value transmission take place via these two wires.

The energy and/or signal transmission between the two-wire field device and the superordinate units in this case takes place in accordance with the known 4 mA to 20 mA standard, in which a 4 mA to 20 mA current loop, i.e. a two-wire cable is formed between the field device and the superordinate unit. In addition to the analogue transmission of signals, there is the possibility that the measuring devices transmit further information to or receive further information from the superordinate unit in accordance with various other protocols, particularly digital protocols. The HART protocol or the Profibus PA protocol are mentioned by way of example for that. The interface may for example also be an IO link interface.

The energy supply of these field devices likewise takes place via the 4 mA to 20 mA power signal, so that no additional supply line in addition to the two-wire cable is necessary.

The field device 101, which is operated in a wired manner, therefore uses the interface 104 for transmitting its measured value externally. In the illustrated embodiment, the field device 101 has a display and control module 103 for enabling an interaction with a user. The display and control module 103 draws its energy required for operation via the interface 102. Furthermore, the retrofitting module 103 uses the interface 102 for communication with field device electronics of the field device 101.

FIG. 1b) shows an autonomously operating field device 105, which draws the energy required for the operation of the field device 105 from an integrated battery 106 and provides a determined measured value externally via a wireless interface 107.

Autonomously operating field devices 105 are self-supporting measuring arrangements, particularly self-supporting fill level or limit level sensors. The self-supporting fill level or limit level sensors are preferably designed as radar sensors and—in order to ensure the self-sufficiency of the sensors—in addition to a measuring sensor for detecting measurement data, have a transmission device for, preferably wirelessly, transmitting detected measurement data or measured values and their own energy supply. The transmission device may preferably be a radio module for a narrowband radio technology (LoRa, Sigfox, LTE-M, NB-IOT), which transmits the measured data or measured values to a cloud, i.e. to a server in the World Wide Web. The energy supply is preferably designed as a battery or rechargeable battery and can additionally comprise an energy harvesting module.

The presently illustrated self-supporting field device 105 has a completely hermetically sealed housing 108. The self-supporting field device 105 has a wirelessly operating display and control module 109 for enabling display and/or operation. Both the energy required by the display and control module 109 and the required data are exchanged wirelessly between the self-supporting field device 105 and the display and control module 109, for example using an RFID technology.

These known field devices 101, 105 have been produced for years on a large scale and have become significantly widespread in the market. Previously known field devices 101, 105 do not hitherto have any technical devices for fulfilling the requirements for attaining a defined IT security level (SL).

Figure 2:
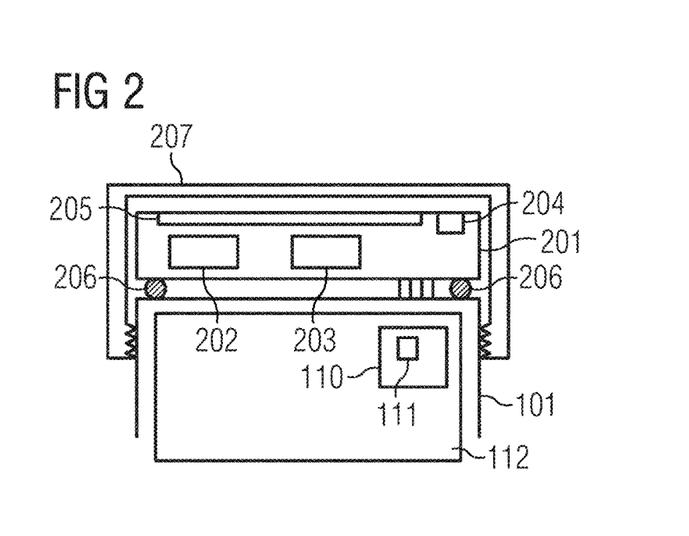
FIG. 2 is a line drawing evidencing an exemplary embodiment according to the present application.

FIG. 2 shows a first retrofitting module 201 according to the invention, which after installation into a known field device 101 creates a technical device in cooperation with the same, in order to implement the requirements for attaining a defined IT security level (SL).

To this end, the retrofitting module 201 has specialized functional units 202 implemented in hardware, which are necessary for achieving the IT security level. In cooperation with functional units 203 implemented in software and hard- and software units 110 of the field device electronics 112 of the field device 101, the requirements, which are necessary for achieving one of the above-defined IT security levels SL1, SL2, SL3 or SL4, are implemented.

The principle underlying the exemplary embodiments is explained in more detail in the following on the basis of the example of user authentication.

For example, should an existing field device 101 be enabled to fulfil the requirements for attaining the security level SL2, then a mechanism for managing a predeterminable list of users with associated passwords and individual access rights must be stored in the field device. Unauthorized access to the settings of the field device 101 should be prevented in this manner.

As the original field device 101 does not have any hard- and software units 110 for implementing user management, the same is provided with a retrofitting module 201, which in the present case is configured as a display and control module. The retrofitting module is configured such that it executes a user login initiated via the keyboard 204 by processing a login routine, which is implemented in software and stored in the functional unit 203, using a previously saved list of authorized users, who are persistently saved in the functional unit 202, which is implemented in the hardware. A login of the user is only accepted if the user is known, i.e. contained in the list stored in hardware, and has input the valid password assigned to the user. If both of these things have taken place, authorized use of the field device 101 is authorized in cooperation with the keyboard 204 and the display 205, for which the display and control module 103, 109 communicates with the field device 101 via the interface 102 in the known manner.

In the context of a modular field device concept, further retrofitting modules 201 are provided by the producer, using which the requirements of other IT security levels are met. Thus, an alternative retrofitting module 201 for attaining the security level SL3 may already have functional units implemented in hard- and software for realizing multifactor authentication. In addition to the keyboard 204, this may for example be an NFC interface (not illustrated graphically here), using which the presence of an NFC token can additionally be verified.

The mounting of the retrofitting module 201 according to the presently illustrated exemplary embodiment is configured to be persistent, i.e. subsequent removal of the retrofitting module 201 is permanently prevented.

Thus, it is prevented that the IT security level SL of the updated overall device 101, 201, achieved by means of the retrofitting module 201, is subsequently deactivated again in an unauthorized manner by unauthorized removal of the retrofitting module 201. To this end, unauthorized removal is prevented by mechanical securing mechanisms. On the one hand, the retrofitting module 201 is connected to the field device electronics 112 of the field device 101 by continuous adhesive bonding 206. On the other hand, the desired persistence is ensured electronically. During initial connection to the field device electronics 112 of the field device 101, the retrofitting module 201 modifies a firmware 111 of the field device 101 such that the same from then onwards only continues to exchange data with precisely this retrofitting module 201 and in the case of a retrofitting module 201 that is not present or in the event of a replacement with an unauthorized retrofitting module 201, suspends operation, in order to signal a fault externally, for example by outputting a status signal for an invalid measured value.

In a further embodiment, it may additionally or alternatively be provided to replace the lid 207 with a mechanically modified lid, which mechanically prevents unscrewing after one-time closure, so that access to the retrofitting module 201 is prevented.

Figure 3:
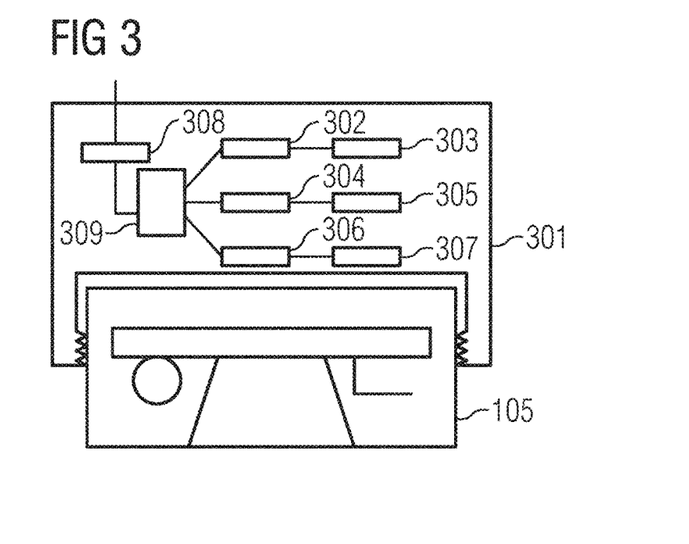
FIG. 3 is a line drawing evidencing a third exemplary embodiment of a field device according to the present invention, comprising a retrofitting module.

FIG. 3 shows a further exemplary embodiment of a retrofitting module 301 for attaining a defined IT security level (SL). As can be seen from the graphic, a self-supporting field device 105 is here by way of example made capable by a retrofitting module 301 of meeting extended requirements with regards to the achievement of an IT security level (SL).

In cooperation with the software units 303, 305, 307, the hardware units 302, 304, 306 realize a defined number of functionalities which are necessary for attaining a plurality of differing IT security levels (SL). A defined IT security level (SL) can be set by a user by means of a selector 308. For example, in a first position of the selector 308 of a selection unit 309, for example a multiplexer, the security function of the hardware component 302 is activated in cooperation with the software units 303. At the same time, the units 304, 305, 306, 307 may be deactivated. Thus, the retrofitting module 301 is enabled, in cooperation with the field device 105, to implement the requirements according to a first IT security level (SL). If by contrast, the selection unit 309 is activated in a second position, then the units 302, 303, 306, 307 can be deactivated and the units 304, 305 can be activated to meet the requirements of a second IT security level (SL). According to this schema, it is possible to provide a retrofitting module which extends existing sensors such that the same in cooperation with the retrofitting module meet the requirements according to an IT security level SL which can be chosen in the retrofitting module 301.

It is emphasized at this point that the choosability of the IT security level SL described here can be achieved both with wired retrofitting modules 201 and with wirelessly operating retrofitting modules 301.

Figure 4:
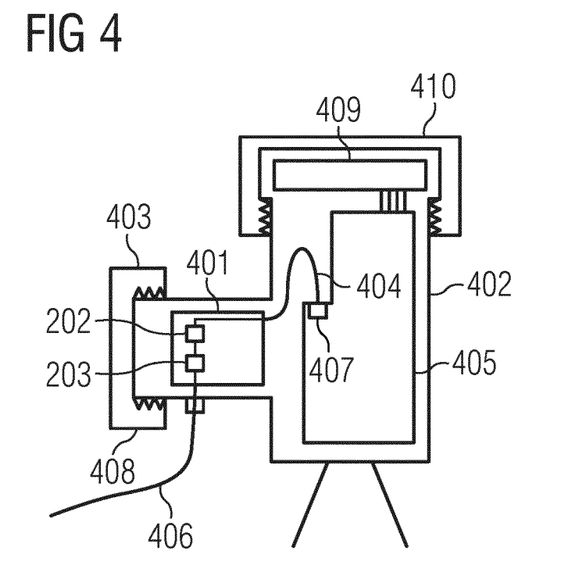
FIG. 4 is a line drawing evidencing an exemplary embodiment for a method according to the present application.

FIG. 4 shows a further variant of a retrofitting module 401.

A range of field devices in the process industry is delivered with what are known as double chamber housings 402, which offer the possibility of accommodating components for lightning protection or explosion protection in a second housing chamber 403. These components are connected to the actual field device electronics 405 internally in the housing by means of at least one wire connection 404.

The retrofitting module 401 illustrated in FIG. 4 has, like the retrofitting modules 201, 301, hard- and software units 202, 203, which are suitable in cooperation with the field device electronics 405 for implementing the requirements for achieving a defined IT security level SL. The retrofitting module 401 to this end has at least two wired interfaces, and can in this manner be installed in the supply arm between the communication line 406 and the field device electronics 405.

Potential IT-relevant security attacks can take place in a range of devices essentially only via a wired interface. It is therefore an effective approach to cut the communication line 406 and to install a retrofitting module 401 in the second sensor chamber. In the exemplary embodiment shown, the retrofitting module 401 has a wired output line 404 with a defined length, which is designed so as to connect the original contacting interface 407 of an existing device. It may additionally or alternatively be provided that the retrofitting module 401 is fastened on the field device 402 such that it cannot be removed again (is mechanically persistent). In the present exemplary embodiment, the retrofitting module 401 is fastened in the housing 402 of the field device by means of secure screw connectors, which can be fixed using adhesive.

In addition, it may be provided to replace the original housing lid (not illustrated) with a housing lid 408 which is self-adhesive and therefore cannot be removed again.

The retrofitting module 401 takes on a range of security functions for the field device 301, depending on the required IT security level SL, that is to say for example user management, authentication, encryption or else other functions, which may be required by the respective standard according to the desired IT security level. It may in particular also be provided that the retrofitting module 401 acts as a firewall and continuously checks and if appropriate rejects the incoming data packets.

It may be provided according to the present application, depending on the desired IT security level SL, to provide various retrofitting modules 401 for retrofitting at the customer or in the factory. Additionally or alternatively, a security module can be configured such that it can be configured in accordance with the above exemplary embodiments and thus realizes different IT security levels SL.

A sensor retrofitted in this manner can subsequently only still be reached externally via the communication line 406 by means of the retrofitting module 401 and the functional modules 203 contained therein, which are predominantly configured as additional software. An unauthorized access and manipulation at the installation site can be reliably prevented by adhesively bonding the housing lid 408.

Furthermore, it may for example be necessary for realizing higher IT security levels (SL) to authenticate on the field device 402 via multifactor authentication prior to access. In multifactor authentication, it may be necessary to combine two or more security features from the groups knowledge, ownership or presence, in order to ensure a particularly reliable authentication. Thus, it may for example be necessary, to transmit a security feature "knowledge" in the form of a secret password in a wired manner via an interface to a first retrofitting module 401, and additionally, to prove the ownership of a user-specific token (e.g. RFID chip, password vault, U2F module) at the sensor by plugging on a second security module 409, which contains the token or at least an interface for reading a token. A higher IT security level SL can be achieved in this manner by means of a combination according to the invention of a first retrofitting module 401 and a second security module 409. It may also additionally or alternatively be provided to modify the field device electronics 405 by means of well-established software such that the same enables a direct communication of the first retrofitting module 401 with the second security module 409, in order to implement specific requirements of a security level.

In addition, it should be emphasized that a multiplicity of hard- and software units may be contained in the security modules 201, 301, 401 and 409 for implementing specific security functions. Mentioned explicitly at this point are hardware and software units for implementing requirements relating to:

the logging and monitoring of sensor events and login attempts, the authentication of external devices and users by means of knowledge, for example with the aid of the input of a secret number, a password or a PIN, the authentication of external devices and users by means of ownership, for example using mechanical keys and/or electronically readable tokens (RFID, NFC, U2F), the authentication of external devices and users by means of presence, for example with the aid of a touch panel and handwriting recognition software, a microphone and voice recognition software, a scanner and fingerprint recognition software, user management and the management of rights of the respective users, the mechanical integrity of the sensor, for example by means of sealing or adhesive bonding devices, ensuring the mechanical and/or electronic persistence of retrofitting modules, and the functional procedure of the original sensor, for example by maintaining specific software updates.

LIST OF REFERENCE NUMBERS 101, 105, 108, 402 Field device
102 Interface
103, 109 Display and control module
104 Cable connection
106 Battery
107 Wireless interface
108 Housing
110 Hard- and software units
111 Firmware
112, 405 Field device electronics
201, 301, 401 Retrofitting module
202 Functional unit
203 Functional unit
204 Keyboard
205 Display
206 Adhesive bonding
207 Lid
302, 304, 306 Hardware units
303, 305, 307 Software units
308 Selector
309 Selection unit
402 Double chamber housing
403 Housing chamber
404 Wired connection
405 Sensor electronics
406 Communication line
407 Contacting interface
408 Housing lid
409 Second security module
SL IT security level Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A retrofitting module for a process automation field device comprising field device electronics with at least one communication interface, wherein the retrofitting module has a security module, wherein the security module cooperates with the field device electronics such that a predetermined IT security level (SL) is achieved, wherein the retrofitting module has a first electrical interface for connecting the field device electronics of the field device and a communication module for connecting to a superordinate unit, and wherein a connection of the first electrical interface to the communication interface irreversibly interrupts a connection of the field device electronics to the superordinate unit.

2. The retrofitting module according to claim 1, wherein the first interface is configured for connecting to the communication interface of the field device.

3. The retrofitting module according to claim 1, wherein the one connection of the first interface to the communication interface is configured to be mechanically irreversible.

4. The retrofitting module according to claim 1, wherein the retrofitting module has a mechanical interface for irreversible connection to the field device.

5. The retrofitting module according to claim 4, wherein the retrofitting module comprises an irreversible latching connection and/or an irreversible screwed connection and/or an irreversible adhesively bonded connection and/or an irreversible barrier.

6. The retrofitting module according to claim 1, wherein the retrofitting module has a cryptomodule for signing and/or encrypting data.

7. The retrofitting module according to claim 1, wherein the retrofitting module has an authentication module.

8. The retrofitting module according to claim 1, wherein the retrofitting module has an authentication interface for an external, second authentication module.

9. The retrofitting module according to claim 1, wherein the retrofitting module has a packet filter.

10. The retrofitting module according to claim 1, wherein the retrofitting module is configured as a display and/or control module.

11. The retrofitting module according to claim 1, wherein the security module has a plurality of functional units for implementing a plurality of predetermined IT security levels (SL) of different severity, wherein the security module has a selection element for selecting an IT security level (SL), wherein on the basis of the selection, the functional units necessary for implementing the selected IT security level (SL) are activated and/or the functional units not required are deactivated.

12. The retrofitting module according to claim 11, wherein the security module is configured such that the security module allows for a one-time selection of the IT security level (SL).

13. The retrofitting module according to claim 1, wherein the security module is configured such that the security module allows for a selection of the IT security level (SL) during commissioning of the retrofitting module.

14. A modularly constructed process automation field device comprising field device electronics with at least one communication interface, wherein the field device has a retrofitting module according to claim 1, which is connected to the communication interface of the field device electronics.

* * * * *